United States Patent
Vogan (10) Patent No.: US 8,631,187 B2
(45) Date of Patent: Jan. 14, 2014

(54) DUAL-SCOPE DIRECTORY FOR A NON-VOLATILE MEMORY STORAGE SYSTEM

(75) Inventor: Andrew Vogan, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 1048 days.

(21) Appl. No.: 12/462,695

(22) Filed: Aug. 7, 2009

(65) Prior Publication Data

US 2011/0035534 A1 Feb. 10, 2011

(51) Int. Cl.
*G06F 12/00* (2006.01)

(52) U.S. Cl.
USPC ............. 711/103; 711/E12.069; 711/E12.082

(58) Field of Classification Search
USPC .......................................................... 711/103
See application file for complete search history.

(56) References Cited

U.S. PATENT DOCUMENTS

| 5,544,356 A * | 8/1996 | Robinson et al. ............. 707/821 |
| 2009/0172499 A1 * | 7/2009 | Olbrich et al. ................. 714/773 |

FOREIGN PATENT DOCUMENTS

CN 101147119 3/2008

OTHER PUBLICATIONS

Office Action received for Chinese Patent Application No. 201010248967.3, mailed Mar. 5, 2013, 10 pages.

* cited by examiner

*Primary Examiner* — Manorama Padmanabhan
*Assistant Examiner* — Hamdy S Ahmed
(74) *Attorney, Agent, or Firm* — Kacvinsky Daisak PLLC (57) ABSTRACT

A device, system, and method are disclosed. In one embodiment the device includes a non-volatile memory (NVM) storage array to store a plurality of storage elements. The device also includes a dual-scope directory structure having a background space and a foreground space. The structure is capable of storing several entries that each correspond to a location in the NVM storage array storing a storage element. The background space includes entries for storage elements written into the array without any partial overwrites of a previously stored storage element in the background space. The foreground space includes entries for storage elements written into the array with at least one partial overwrite of one or more previously stored storage elements in the background space.

25 Claims, 7 Drawing Sheets

DUAL-SCOPE DIRECTORY FOR A NON-VOLATILE MEMORY STORAGE SYSTEM

FIELD OF THE INVENTION

The invention relates to non-volatile memory storage systems. More specifically, the invention relates to directory structures maintained for use with non-volatile memory storage systems.

BACKGROUND OF THE INVENTION

Non-volatile memory (NVM) storage is very popular in the computer industry and the electronics industry. Computers have long utilized NVM storage for basic input/output system (BIOS) code storage and other important boot routines. But, more recently, the usage models for NVM storage have expanded greatly from digital camera image storage to digital music player storage of songs. NVM devices have dramatically decreased in size and increased in storage capacity. Now the computer industry is beginning to build solid state drives (SSDs) utilizing NVM devices for mass storage. SSDs may someday significantly replace conventional hard disk drives due to in part to superior performance, smaller profiles, and lower power requirements.

BRIEF DESCRIPTION OF THE DRAWINGS

The present invention is illustrated by way of example and is not limited by the drawings, in which like references indicate similar elements, and in which.

DETAILED DESCRIPTION OF THE INVENTION

Embodiments of a device, system, and method, to maintain a dual-scope directory structure for a non-volatile memory are described.

A computer system may include a non-volatile memory (NVM) storage subsystem. In many embodiments, the NVM storage subsystem may be a solid state drive (SSD). In other embodiments, the NVM storage subsystem may be utilized for a different purpose than a general purpose storage drive. The NVM storage subsystem includes one or more NVM devices. For example, there may be several NAND flash memory devices that create a storage array within the NVM storage subsystem. A NVM storage subsystem, such as an SSD, stores a large number of storage elements that can be of varying size. When a write request arrives at the NVM subsystem, the data to be written to the NVM devices is then written in blocks to a NVM storage array within the subsystem.

To maintain a simple access structure to where these blocks are located, a directory structure is normally maintained in volatile memory, such as system memory. The directory structure includes entries corresponding to each element stored in the NVM storage array.

In many embodiments, when a write request arrives, the logic associated with the NVM subsystem parses out at least a logical block address (LBA) start address and an operation size. In many instances where a storage element already is stored located of the new write, the older element is partially overwritten. In some cases, the new element effectively splits the old element in two (i.e. a front portion before the start of the new element and a back portion after the end of the new element). With current directory structures, this causes the logic maintaining the directory to add an additional entry apart from the entry added for the new element because the older element now is two elements. This is required because current directory structures maintain a single linear scope for all entries.

In many embodiments, a dual-scope directory structure is proposed, which allows entries corresponding to new elements to be written into a foreground space in the directory structure, while older larger elements are capable of maintaining a single entry in a background space in the directory structure. This essentially allows for the creation of less total entries in the directory structure as new storage elements are continually introduced.

Reference in the following description and claims to "one embodiment" or "an embodiment" of the disclosed techniques means that a particular feature, structure, or characteristic described in connection with the embodiment is included in at least one embodiment of the disclosed techniques. Thus, the appearances of the phrase "in one embodiment" appearing in various places throughout the specification are not necessarily all referring to the same embodiment.

In the following description and claims, the terms "include" and "comprise," along with their derivatives, may be used, and are intended to be treated as synonyms for each other. In addition, in the following description and claims, the terms "coupled" and "connected," along with their derivatives may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate, interact, or communicate with each other.

Figure 1:
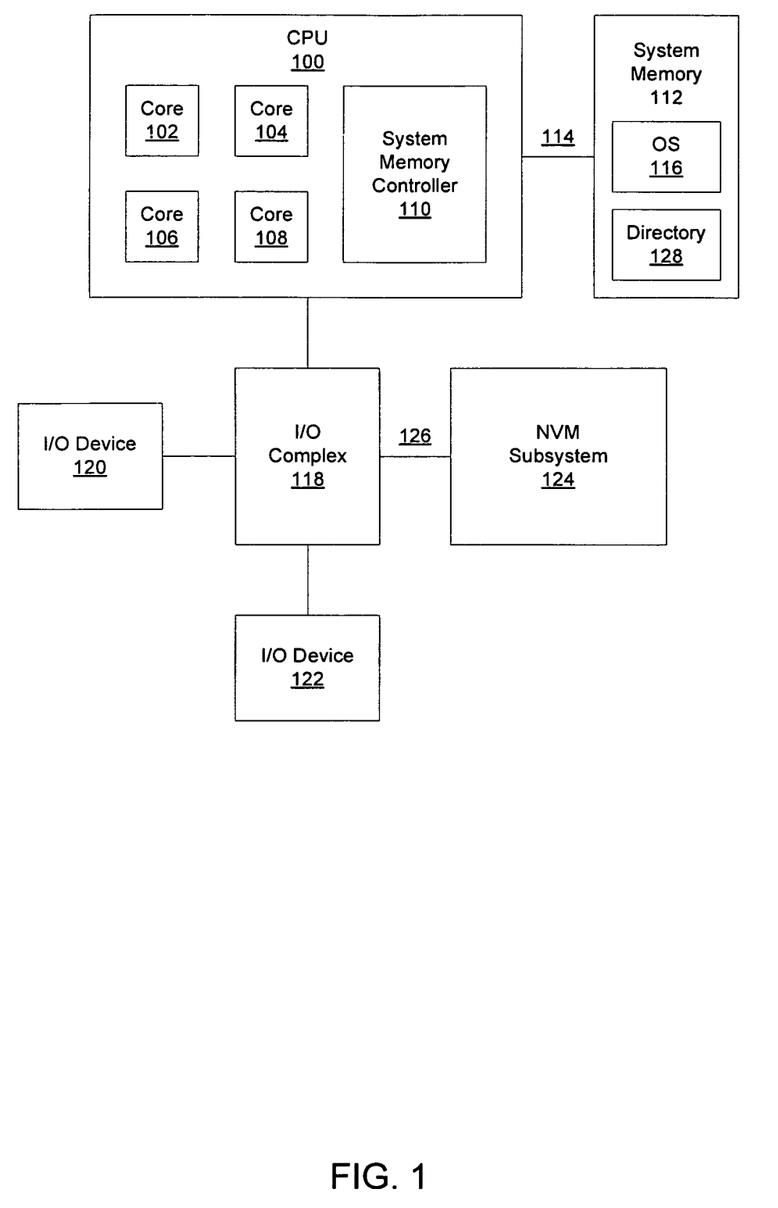
FIG. 1 illustrates an embodiment of a computer system including a non-volatile memory storage system.

FIG. 1 illustrates an embodiment of a computer system including a non-volatile memory storage system. The computer system includes one or more central processing units (CPUs), such as CPU 100. In many embodiments, CPU 100 is an Intel® Corporation CPU. In other embodiments, CPU 100 is another brand CPU. CPU 100 includes one or more processor cores, such as cores 102, 104, 106, and 108. Each core includes one or more execution units, retirement units, a number of storage registers, potentially one or more cache memories, as well as other circuitry that generally resides within a CPU core. CPU 100 also may include a system memory controller 110 to control communication with a system memory 112. A system memory interconnect 114 communicatively couples the system memory 112 with CPU 100. The interconnect may include lines to transport address, data, control and clock information between CPU 100 and system memory 112. Although system memory controller 110 resides within CPU 100 in FIG. 1, in other embodiments that are not shown, system memory controller 110 may reside in a separate integrated circuit, discrete from CPU 100, in the computer system.

System memory 112 may be a dynamic random access memory (DRAM) in many embodiments. For example, system memory 112 may be a form of double data rate (DDR) synchronous DRAM. In other embodiments, system memory may be another form of memory, such as a non-volatile memory. System memory 110 may store instructions and data to be executed by the CPU 100. For example, system memory 110 may store an operating system (OS) 116 during the operation of the computer system.

In many embodiments, CPU 100 is communicatively coupled to an I/O (input/output) complex 118. The I/O complex 118 may include one or more I/O controllers (not shown) that allow the computer system to communicate with one or more I/O devices (such as devices 120 and 122). For example, I/O complex 118 might include a universal serial bus (USB) controller and I/O devices 120 and 122 may be USB devices.

In many embodiments, the I/O complex 118 is also coupled to a non-volatile memory (NVM) subsystem 124. The NVM subsystem 124 includes at least one or more non-volatile memory devices. In different embodiments, the NVM devices may include certain types of flash memory such as NAND and NOR-based devices, phase change memory (PCM), electrically erasable programmable read only memory (EEPROM), or one or more other types of NVM. The NVM devices may store data that is not contingent upon power being supplied to the NVM subsystem. Thus, during computer system reset sequences, power down and up sequences, as well as any other sequence that may cycle the power to the computer system, the NVM subsystem can continue to store data in the one or more devices. This is opposed to the system memory 112, which requires power to store data. Any data stored in the system memory 112 during a reset or power sequence would be lost if not saved elsewhere during the sequence.

The NVM subsystem 124 is communicatively coupled to the computer system by way of an interconnect 126. Interconnect 126 comprises one or more lines that are utilized to transmit data, address, control, and other signals. In some embodiments, the lines may comprise copper wires. In other embodiments, the lines may comprise another metal or alloy, optical lines, or another medium utilized to transmit information.

In many embodiments, interconnect 126 communicatively couples the NVM subsystem 124 with the I/O complex (component 118 in FIG. 1). However, in other embodiments, interconnect 126 may communicatively couple the NVM subsystem 124 with another integrated circuit component within the computer system.

Figure 2:
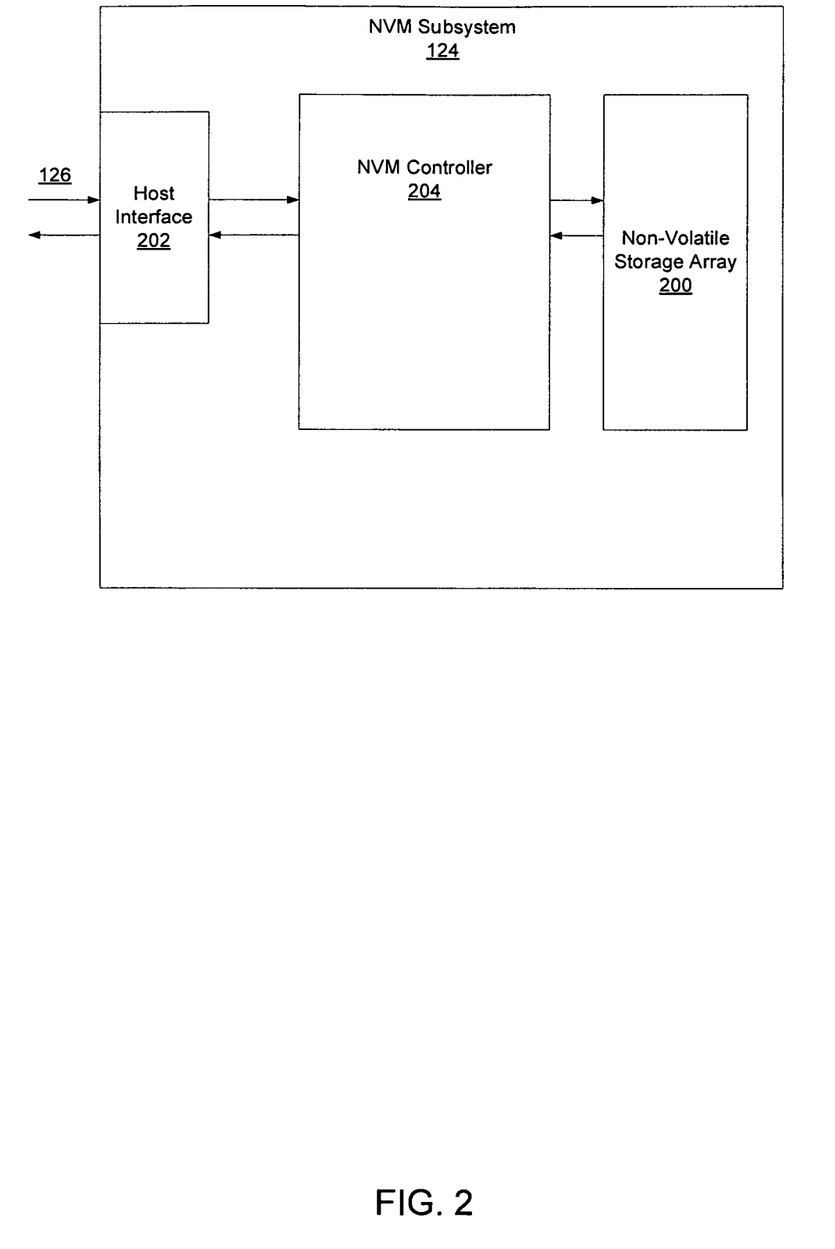
FIG. 2 illustrates a detailed view of an embodiment of the NVM subsystem.

FIG. 2 illustrates a detailed view of an embodiment of the NVM subsystem. The NVM subsystem includes a NVM storage array 200. In different embodiments, the storage may be flash memory or another form of memory storage that is non-volatile. For example, the storage may comprise one or more NAND devices. In other embodiments, the non-volatile storage array 200 may comprise NOR devices, PCM, an EEPROM, or another type of NVM. In many embodiments, the non-volatile storage array includes one or more NVM devices and the devices are each sub-divided into a number of sectors.

The NVM subsystem 124 includes a host interface 202. The host interface 202 is the communication interface between the NVM subsystem 124 and the remainder of the computer system. For example, communication between a host CPU, such as CPU 100 in FIG. 1, and the NVM subsystem 124 may take place through the host interface 202. Read and write requests from CPU 100 may be routed through the host interface 202 into the NVM subsystem 124. In many embodiments, the host interface 202 includes one or more buffers that can store several read and write requests entering the NVM subsystem 124. The buffers may be in the form of queues, such as first-in first-out (FIFO) queues, which may store requests that enter the NVM subsystem 124.

The host interface 202 may receive host requests, such as read and write requests, and then forward them to an NVM controller 204. Control logic within the NVM controller 204 may process the requests and write to or read from the non-volatile storage array 200.

In many embodiments, the NVM subsystem 124 stores data in logical blocks. For each write, data is written into the NVM storage array 200 between a logical block address (LBA) start address and a LBA end address. Each piece of data stored in the NVM storage array 200 may be referred to as a storage element. Thus, in many embodiments, storage elements have a designated LBA start address and either an LBA end address or size. This information allows a storage element to be read simply by using the LBA start address and the LBA end address to capture the entire amount of data.

In many embodiments, each storage element is tracked using a directory structure. The directory structure may be stored in system memory (e.g. directory 128 in system memory 112 in FIG. 1) or in memory elsewhere in the computer system. For example, in another embodiment, the directory structure may be located in a memory storage within the NVM subsystem 124. Generally, the memory storing the directory structure would be located in a volatile memory, though that is not required.

The directory structure includes an entry for each storage element to track the elements for the purposes of future writes and reads to and from the NVM storage array 200. The composition of each entry stored in the directory structure may vary in different embodiments. For example, security access writes per element may require extra information to be stored within the entry. But generally, each entry has at least the LBA of the start address and the LBA of the end address or span of entry in logical space. In many embodiments, the entry also may include a specific NVM storage array address location. For example, each entry may be 8 bytes in size, wherein 2 bytes may be the LBA start address, 2 bytes may be the LBA end address, and 4 bytes may be the NVM storage array address. In other embodiments, the entry may comprise different or perhaps additional information. Depending on implementation, the LBA may be represented by a different amount of bits due to how small or how large the storage units are (e.g. if the smallest unit of storage is one kilobyte, there may be no need to store address bits representing locations at smaller than a one kilobyte granularity).

In many embodiments, the directory structure allows a level of indirection to the data. For example, although the directory structure involves linear and contiguous storage elements that each may be of any give size, the NVM controller may translate the linear addresses into physical addresses, which might not comprise linear blocks of data. In fact, physically the data may be spread out at random across the NVM storage array to allow for wear leveling of the NVM devices. Since NVM devices generally have a finite lifespan, and become unreliable after a large number of writes, it is important to spread writes out evenly among all devices, so as to lengthen the overall lifespan of the array.

The entries may be altered in a number of ways. For example, if an older storage element is entirely overwritten by a newer storage element, the entry corresponding to (i.e.

associated with) the older storage element may be erased (i.e. freed) to free up memory storage.

In a single scope directory structure, there is a linear space associated with all LBAs that comprise the entire storage array. For each storage element in the array, if that storage element is partially overwritten by a new storage element but not completely overwritten, a new entry must be created for the new storage element in the directory structure. In addition to the new entry, the entry corresponding to the partially overwritten older storage element will need to be modified. In certain scenarios, a second additional new entry would be required to be created if the partially overwritten older storage element was cut into two separate pieces with the new element in between. This causes additional space requirements in the single scope directory structure because instead of one additional entry being created, there is now a second additional entry that is required to accurately represent the remaining pieces of the older storage element.

Figure 3:
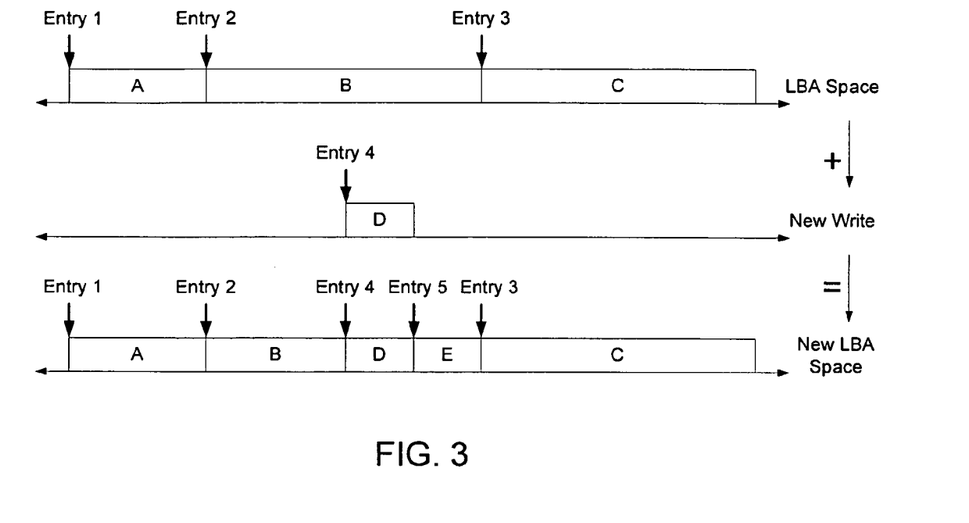
FIG. 3 illustrates an embodiment a single scope directory structure adding a new storage element through a write.

FIG. 3 illustrates an embodiment a single scope directory structure adding a new storage element through a write. LBA space shows three separate storage elements stored in the NVM storage array: storage elements A, B, and C. These storage elements correspond to three entries located in the directory structure: entries 1, 2, and 3.

Then a new write takes place that adds element D to the LBA space. Entry 4, which includes the information describing element D, needs to be added to the directory structure. In this particular case, element D is completely enclosed within the location of element B. In other words, element B starts prior to the start of element D and the end of element B is past the end of element D in the linear LBA space.

Thus, to accurately represent element D as well as the remaining valid portions of element B in the directory structure, a second new entry, Entry 5, is created. The result shows that elements A and C and their corresponding entries 1 and 3 have not changed. Though now, entry 4 represents the newly written element D, entry 2 represents the still valid portion of element B prior to the start of element D, and entry 5 represents the still valid portion of element B (now element E) after the end of element D. A negative aspect of the single scope directory structure is shown here because although only a single storage element was added to LBA space, the limitations of the single scope directory structure required adding two entries into the directory structure.

FIGS. 4-8 illustrate several embodiments of a dual scope directory structure adding a new storage element through a write.

Figure 4:
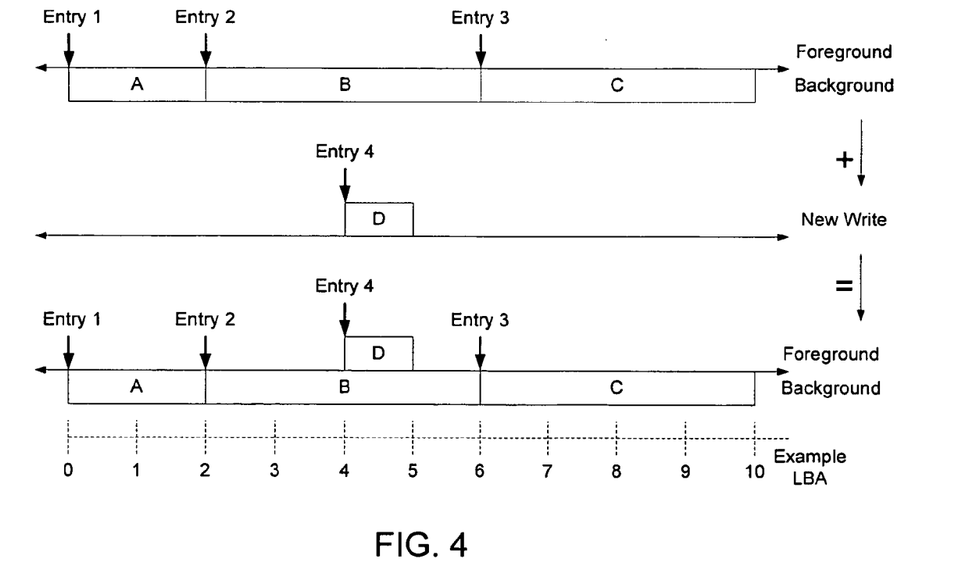
FIGS. 4-8 illustrate several embodiments of a dual scope directory structure adding a new storage element through a write.

FIG. 4 illustrates the same example storage elements and sizes as was seen in FIG. 3 shown now utilizing the dual-scope nature of the directory structure. The dual-scope nature of the directory structure allows the structure to operate a foreground space and a background space together. These two separate spaces are related solely to the directory structure. The actual NVM storage array can still be viewed as a single linear array of LBAs. The linearity is shown by way of the dual-ended arrows across the length of each figure (i.e. each point on that x-axis line may be viewed as a single LBA).

For ease of explanation, the NVM storage array includes the data that may be seen when figuratively looking down to the linear array from a point above the foreground, and then through the foreground to the background. In other words, at a given LBA, if there is no storage element shown in FIG. 4 in the foreground, then the data stored at that LBA is the data in the storage element shown in the background. Finally, at a given LBA, if there is a storage element shown in the foreground and a storage element shown in the background at the same LBA, then the storage element shown in the foreground takes precedence (i.e. the data from the background storage element at that LBA was overwritten by the data from the foreground storage element).

Returning to FIG. 4, LBA space shows three separate storage elements stored in the NVM storage array: storage elements A, B, and C. These storage elements correspond to three entries located in the background of the directory structure: entries 1, 2, and 3.

Then a new write takes place that adds element D to the LBA space. Entry 4, which includes the information describing element D, is then added to the foreground of the directory structure. In this particular case, element D is completely enclosed within the location of element B. In other words, element B starts prior to the start of element D and the end of element B is past the end of element D in the linear LBA space.

In the dual-scope directory structure implementation, the element D write can take place and overwrite the portion of element B in the NVM storage array and a single entry, entry 4, will be added to the directory structure. Thus, at this point the directory structure still has the three original entries in the directory structure, entries 1, 2, and 3, as well as the new entry 4. Each of the original entries remains intact with no modifications necessary. This includes entry B, which keeps its initial LBA start and end addresses. Thus, after the write, the foreground space in the directory structure includes entry 4 and the background space includes entries 1, 2, and 3.

When a read takes place in a dual-scope embodiment, the read may start at a given LBA and traverse across one or more elements. Each element is either represented by an entry in the foreground or background space of the directory structure. Entries in the foreground space of the directory structure take precedence over entries in the background space. Thus if there are entries in both the foreground and background spaces at a given LBA, the read would pull data utilizing the foreground entry information.

Logic, which may be within the NVM controller 204 or elsewhere in the computer system, utilizes the directory structure to crawl through the NVM storage array to pull data for a read. For example, using the linear line of example LBAs at the bottom of FIG. 4 after the new write has already taken place, suppose a read request came in that wanted data from LBA 2 through 7. Logic would begin by looking up LBA 2 in the directory structure and determining if there is an entry at that location in foreground space. Because there is no foreground space entry, the logic then checks for an entry in background space and finds that storage element B (represented in the directory structure by entry 2) is located at LBA 2. The logic then determines that entry 2 is valid at LBA 2 to LBA 4 and reads the data from those LBA locations. At LBA 4, the logic realizes a foreground entry is present (entry 4) and then reads storage element D at LBA 4. Then seeing that no foreground entry is located at LBA 5, the logic returns to entry 2 and reads the remainder of storage element B starting at LBA 5. Entry 2 ends at LBA 6, but logic sees that another background space entry is present at LBA 6, entry 3. Logic reads data from storage element C corresponding to entry 3, from LBA 6 through LBA 7 and completes the read.

In many embodiments, the logic within the NVM controller 204 or elsewhere keeps track of elements in the foreground and background at each LBA as the read progresses from the starting LBA to the finishing LBA. In some embodiments, the logic may be in the form of an IF-THEN routine, where, for each LBA:

if entry located in foreground, then read from foreground entry's element; else read from background entry's element;

In some embodiments, the read process may utilize recursive logic to return to background space entries several times upon completing the read of any elements represented by foreground space entries.

Many other algorithms may be available for reading utilizing a dual-scope directory structure.

Figure 5:
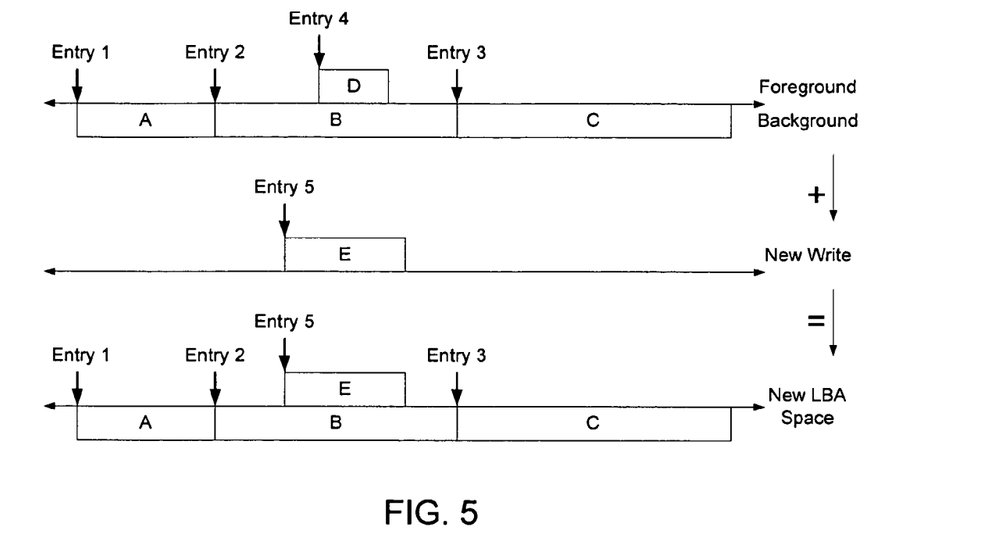

FIG. 5 illustrates another embodiment of a dual scope directory structure adding a new storage element through a write.

At the start of the write process in FIG. 5, there are three separate storage elements stored in the NVM storage array that are represented by entries in the background space of the directory structure: storage elements A, B, and C with their respective entries 1, 2, and 3. There is also one storage element stored in the NVM storage array that is represented by an entry in the foreground space of the directory structure: storage element D and its entry 4.

Then a new write takes place that adds element E to the LBA space. Entry 5, which includes the information describing element E, is then added to the foreground of the directory structure. In this particular case, element D, that was previously represented by foreground entry 4D, is completely overwritten by element E. Thus, in this case, storage element D and entry 4 no longer exist and are replaced by element E in the NVM storage array and entry 5 in the foreground space of the directory structure.

Figure 6:
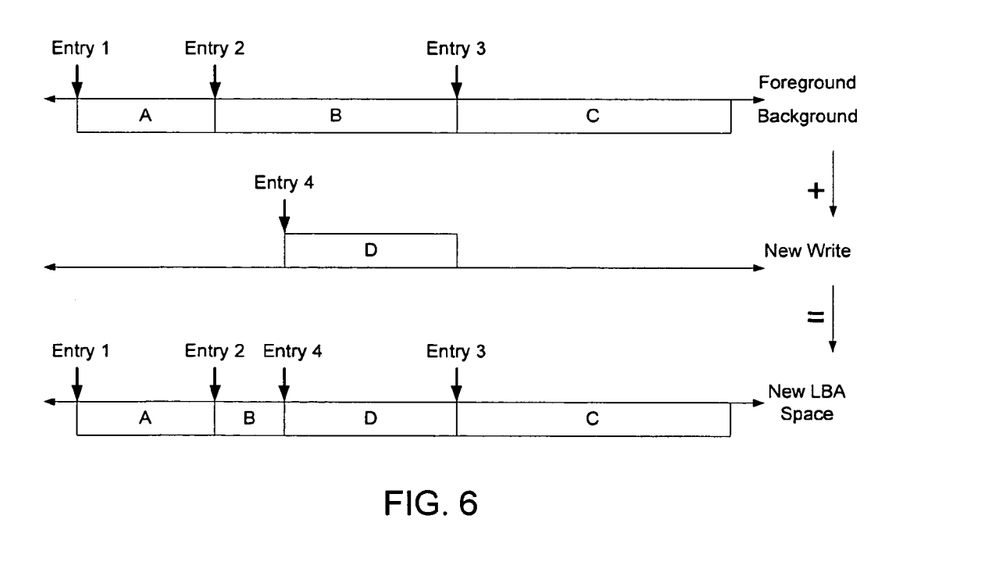

FIG. 6 illustrates another embodiment of a dual scope directory structure adding a new storage element through a write.

At the start of the write process in FIG. 6, there are three separate storage elements stored in the NVM storage array that are represented by entries in the background space of the directory structure: storage elements A, B, and C with their respective entries 1, 2, and 3.

Then a new write takes place that adds element D to the LBA space. Entry 4, which includes the information describing element D, is then added to the LBA space, but in different embodiments, the entry corresponding to element D may be added to either the foreground or background space in the directory structure. This is particularly the case for this example because element D, while having a different starting LBA than entry 2 (which it is partially overwriting) has the same ending address. Thus, element B does not have to be split into a new smaller element B and an additional element E (such as was the case in FIG. 4). Here, the only remaining valid portion of element B is from the original start LBA of entry 2 to the start LBA of element D (at entry 4). Since a second entry was not needed, there is no additional entry storage space needed in the directory structure as was required in the embodiment shown in FIG. 4. Thus, in some embodiments, entry 4 in FIG. 6 may be added to the foreground space (similar to FIG. 4), but in other embodiments, entry 4 in FIG. 6 may be added to the background space as it would have otherwise in a single scope directory structure.

In some embodiments, logic determining whether or not to add a new entry to the foreground space or background space of the directory structure may utilize a simple test where a background space entry will be added for the new storage element if that is the only entry required to be added in the entire directory structure (i.e. add one entry total for adding the single new storage element). Otherwise, a foreground space entry will be added for the new storage element if by adding a background space entry a second background space entry would be required (i.e. the single scope limitation of adding two entries total for adding the single new storage element, described above).

Figure 7:
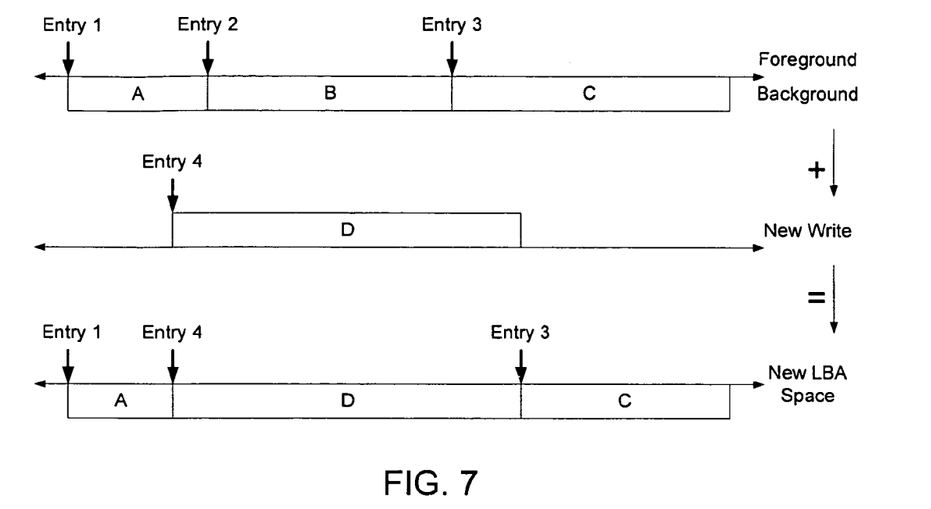

FIG. 7 illustrates another embodiment of a dual scope directory structure adding a new storage element through a write.

At the start of the write process in FIG. 7, there are three separate storage elements stored in the NVM storage array that are represented by entries in the background space of the directory structure: storage elements A, B, and C with their respective entries 1, 2, and 3.

Then a new write takes place that adds element D to the LBA space. Entry 4, which includes the information describing element D, is then added to the LBA space, but in different embodiments, the entry corresponding to element D may be added to either the foreground or background space in the directory structure. This is particularly the case for this example because element D completely overwrites element B, rendering entry 2 unnecessary. Thus, in this case, it is beneficial to not put entry 4 representing element D in the foreground space of the directory structure. Using the foreground space would add an entry required to be stored (from three entries to four entries), whereas using the background space to store entry 4 would keep the total number of entries stored in the directory structure the same. In other words, prior to the new write entries 1, 2, and 3 are stored in the background space of the directory structure and after the new write entries 1, 3, and 4 are stored in the background space of the directory structure.

Figure 8:
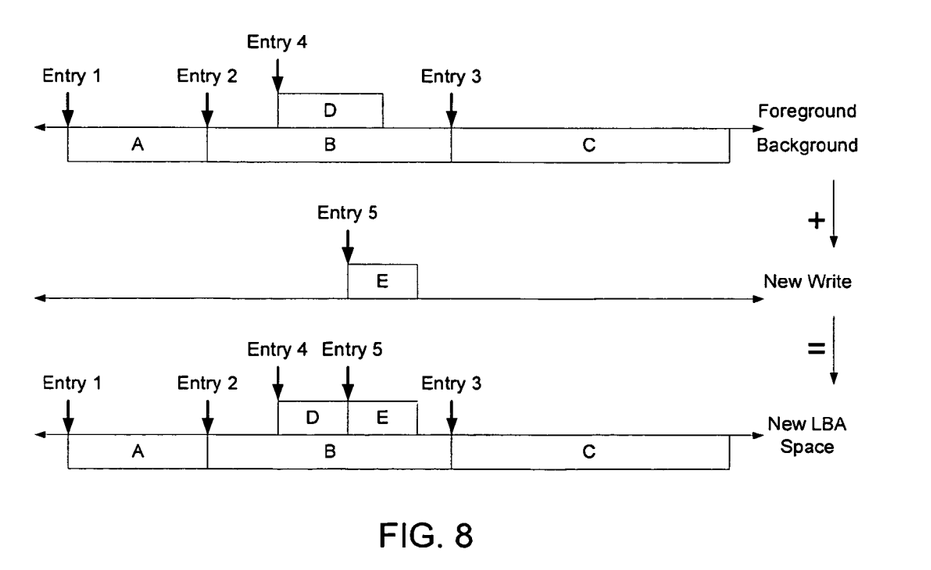

FIG. 8 illustrates another embodiment of a dual scope directory structure adding a new storage element through a write.

At the start of the write process in FIG. 7, there are three separate storage elements stored in the NVM storage array that are represented by entries in the background space of the directory structure: storage elements A, B, and C with their respective entries 1, 2, and 3. There is also one storage element stored in the NVM storage array that is represented by an entry in the foreground space of the directory structure: storage element D and its entry 4.

Then a new write takes place that adds element E to the LBA space. Entry 5, which includes the information describing element E, is then added to the LBA space. In many embodiments, storage element E represented by entry 5 partially overwrites element D represented by entry 4. Thus, entry 5 is stored in the foreground space of the directory structure and entry 4 is modified to accurately describe the new (shorter) length of element D due to its partial overwrite by element E. In this case, background space entries 1, 2, and 3 do not require any modification.

There may be many more rules dictating the specific operation of many types of corner cases. In general though, the foreground space in the directory structure may be utilized when it saves storage space that would otherwise be the result of a single scope directory structure. At any point, the logic controlling the foreground and background space may decide that a desegmentation process for the NVM storage array should take place to clean any level of data fragmentation. In many embodiments, all entries representing all storage elements in the NVM storage array are put into the background space of the directory structure when a defragmentation takes place. In some embodiments, a partial defragmentation may take place in areas that have a significant amount of data fragmentation.

Figure 9:
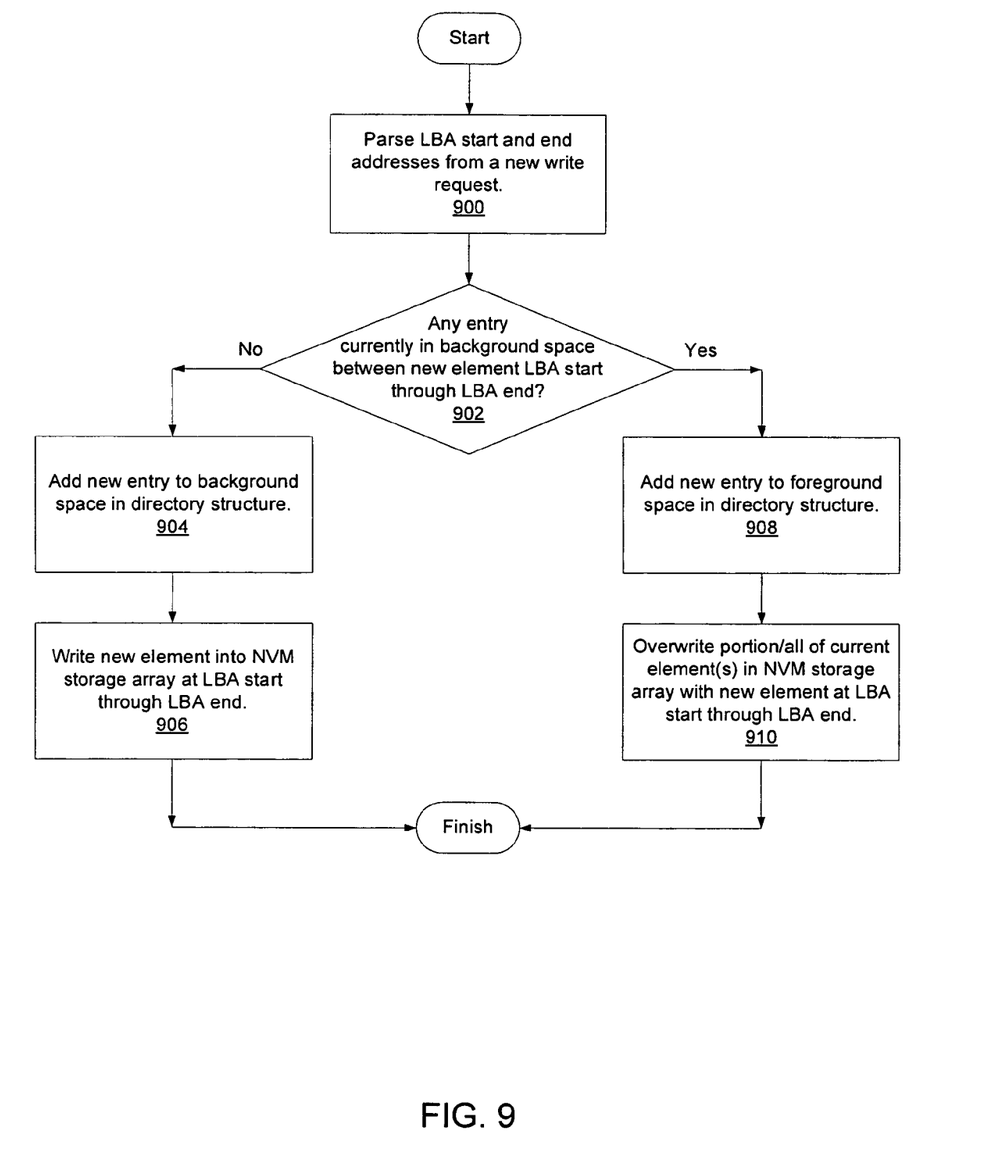
FIG. 9 is a flow diagram of an embodiment of a process to write data into a NVM storage array utilizing a dual-scope directory structure.

FIG. 9 is a flow diagram of an embodiment of a process to write data into a NVM storage array utilizing a dual-scope directory structure. The process is performed by processing logic, which may comprise hardware, software, or a combination of both hardware and software. Turning to FIG. 9 the process begins by processing logic parsing an LBA start address and end address from a new write request (processing block 900). Processing logic then checks to see whether there is currently any entries located in the background space between the LBA start address through the LBA end address (processing block 902).

If there is no storage element containing stored data at the entry in that location in the background space, then processing logic can then add a new entry into the background space in the directory structure (processing block 904). Then processing logic can write the new element into the NVM storage array starting at the LBA start location (processing block 906).

Returning to block 902, if there is an entry in the background space at that location, then processing logic adds the new entry into the foreground space in the directory structure (processing block 908). Finally, processing logic can then write the new storage element over portions or all of any current element(s) in the NVM storage array at the LBA start address through the LBA end address (processing block 910) and the process is finished.

Figure 10:
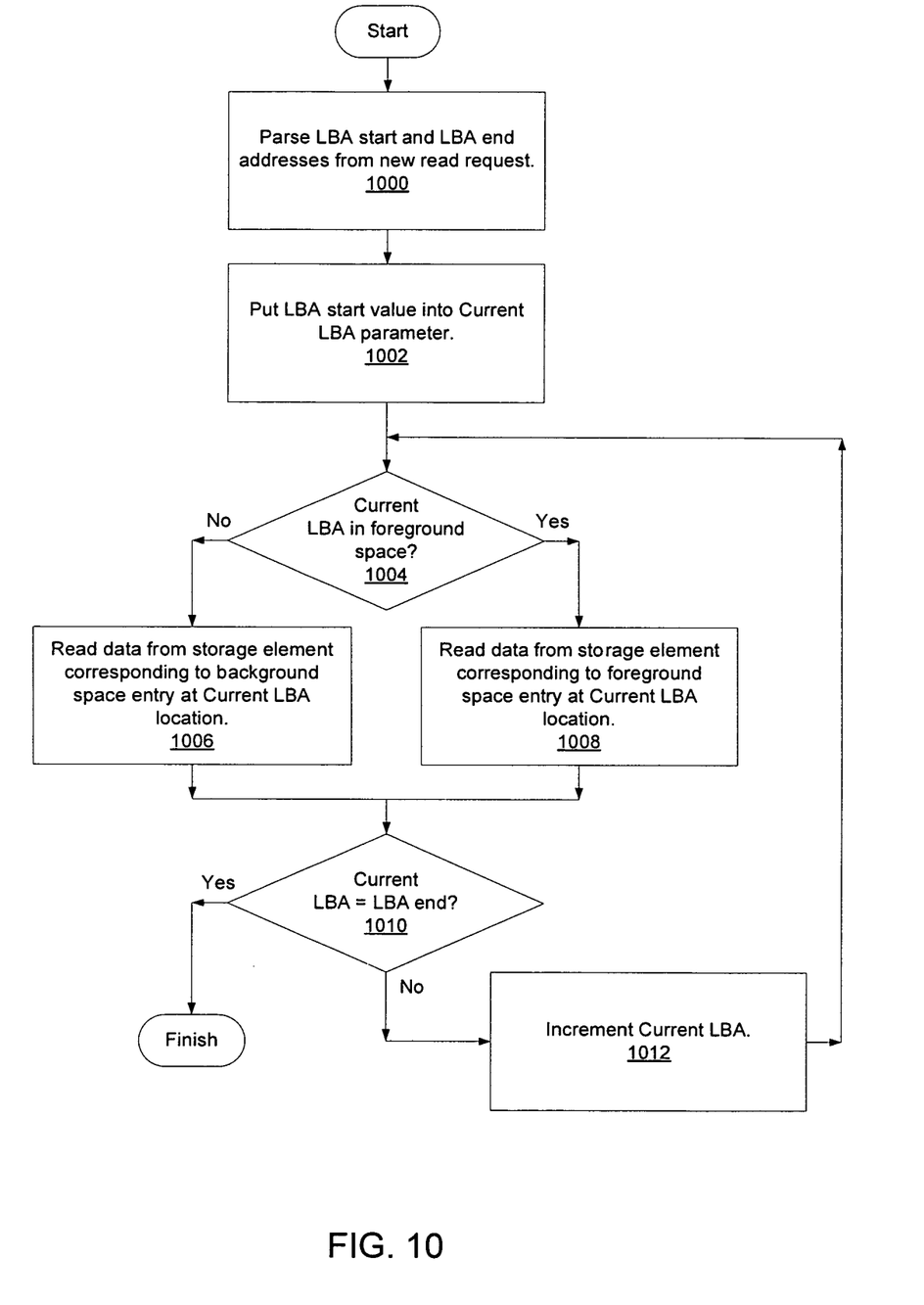
FIG. 10 is a flow diagram of an embodiment of a process to read data from a NVM storage array utilizing a dual-scope directory structure.

FIG. 10 is a flow diagram of an embodiment of a process to read data from a NVM storage array utilizing a dual-scope directory structure. The process is performed by processing logic, which may comprise hardware, software, or a combination of both hardware and software. Turning to FIG. 10 the process begins by processing logic parsing an LBA start address and LBA end address from a new read request (processing block 1000). Processing logic then puts the LBA start address value into a Current LBA parameter (processing block 1002). The Current LBA parameter simply is a storage location utilized by processing logic to point to the current location to read data from within the linear LBA address space.

At the Current LBA processing logic checks to see if the address is located within the range of an entry in the foreground space of the directory structure (processing block 1004). If the current location is not in the foreground space, then processing logic reads data from the storage element corresponding to an entry located in the background space (processing block 1006). Otherwise, if the current location is in the foreground space, then processing logic reads data from the storage element corresponding to an entry located in the foreground space (processing block 1008).

After reading the data, processing logic then checks to see if the current LBA is equal to the LBA end address parsed from the read request (processing block 1010). If the Current LBA parameter is at the LBA end address, then the process is finished. Otherwise, if the Current LBA parameter is not at the LBA end address, then processing logic increments the Current LBA to the next location to be read (processing block 1012) and the process returns to block 1004.

Thus, embodiments of a device, system, and method, to maintain a dual-scope directory structure for a non-volatile memory are described. These embodiments have been described with reference to specific exemplary embodiments thereof. It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

I claim:

1. A non-volatile memory (NVM) write indirection device, comprising:
   a NVM storage array to store a plurality of storage elements; and
   a dual-scope directory structure having a background space and a foreground space, the structure to store a plurality of entries, each entry of the plurality of entries corresponding to a location in the NVM storage array storing one of the plurality of storage elements,
   wherein the background space includes entries for storage elements written into the array without any partial overwrites of a previously stored storage element in the background space and the foreground space includes entries for storage elements written into the array with at least one partial overwrite of one or more previously stored storage elements in the background space.

2. The device of claim 1, wherein each entry of the plurality of entries includes a single logical block address (LBA) start address and a single LBA end address of the storage element.

3. The device of claim 2, wherein each entry corresponding to a storage element in the background space which has been partially overwritten by one or more elements in the foreground space continues to maintain the single LBA start and end addresses.

4. The device of claim 3, further comprising a controller to control access to the NVM storage array.

5. The device of claim 4, wherein the controller is operable to:
   for a given write request including a new storage element to be written to a location in the NVM storage array, create a new entry in the background space in the dual-scope directory structure for the new storage element when the location is currently available to store new data.

6. The device of claim 4, wherein the controller is operable to:
   for a given write request including a new storage element to be written to a location in the NVM storage array, create a new entry in the background space in the dual-scope directory structure for the new storage element when the location is currently storing one or more previously stored storage elements in the background space that would be completely overwritten by the new storage element but not storing one or more previously stored storage elements in the background space that would be partially overwritten.

7. The device of claim 4, wherein the controller is operable to:
   for a given write request including a new storage element to be written to a location in the NVM storage array, create a new entry in the foreground space in the dual-scope directory structure for the new storage element when the location is currently storing one or more previously stored storage elements in the background space that would be partially overwritten.

8. The device of claim 4, wherein the controller is operable to:
   for a given NVM storage array read request beginning at a LBA start address of the read request and continuing to a LBA end address of the read request, and wherein for each address location in the NVM storage array from the LBA start address to the LBA end address, read data from a storage element in the NVM storage array corresponding to a foreground space entry when a foreground space entry is present; and read data from a storage element in the NVM storage array corresponding to a background space entry when a foreground space entry is not present.

9. The device of claim 4, wherein the controller is operable to:
   for a given write request including a new storage element to be written to a location in the NVM storage array, create a new entry in the background space in the dual-scope directory structure for the new storage element when the creation of the new entry in the background space increases the overall number of entries in the background space required to represent all storage elements stored in the NVM array by at most one entry.

10. A system, comprising:
a system dynamic random access memory (DRAM);
a NVM storage array to store a plurality of storage elements; and
a dual-scope directory structure, stored in the system DRAM, having a background space and a foreground space, the structure to store a plurality of entries, each entry of the plurality of entries corresponding to a location in the NVM storage array storing one of the plurality of storage elements,
wherein the background space includes entries for storage elements written into the array without any partial overwrites of a previously stored storage element in the background space and the foreground space includes entries for storage elements written into the array with at least one partial overwrite of one or more previously stored storage elements in the background space.

11. The system of claim 10, wherein each entry includes a single logical block address (LBA) and a length parameter of the storage element.

12. The system of claim 11, wherein each entry corresponding to a storage element in the background space which has been partially overwritten by one or more elements in the foreground space continues to maintain the single LBA and length parameter.

13. The system of claim 12, further comprising a controller to control access to the NVM storage array.

14. The system of claim 13, wherein the controller is operable to:
for a given write request including a new storage element to be written to a location in the NVM storage array, create a new entry in the background space in the dual-scope directory structure for the new storage element when the location is currently available to store new data.

15. The system of claim 13, wherein the controller is operable to:
for a given write request including a new storage element to be written to a location in the NVM storage array, create a new entry in the background space in the dual-scope directory structure for the new storage element when the location is currently storing one or more previously stored storage elements in the background space that would be completely overwritten by the new storage element but not storing one or more previously stored storage elements in the background space that would be partially overwritten.

16. The system of claim 13, wherein the controller is operable to:
for a given write request including a new storage element to be written to a location in the NVM storage array, create a new entry in the foreground space in the dual-scope directory structure for the new storage element when the location is currently storing one or more previously stored storage elements in the background space that would be partially overwritten.

17. The system of claim 13, wherein the controller is operable to:
for a given NVM storage array read request beginning at a LBA start address of the read request and continuing for to a LBA end address of the read request, and wherein for each address location in the NVM storage array from the LBA start address to the LBA end address, read data from a storage element in the NVM storage array corresponding to a foreground space entry when a foreground space entry is present; and read data from a storage element in the NVM storage array corresponding to a background space entry when a foreground space entry is not present.

18. A method, comprising:
storing a plurality of entries in a dual-scope directory structure that includes a background space and a foreground space, each entry of the plurality of entries corresponding to a storage element in a non-volatile memory (NVM) storage array,
wherein the background space includes entries for storage elements written into the array without any partial overwrites of one or more previously stored elements in the background space and the foreground space includes entries for storage elements written into the array with at least one partial overwrite of one or more previously stored elements in the background space.

19. The method of claim 18, wherein each entry of the plurality of entries includes a single logical block address (LBA) and a length parameter of the storage element.

20. The method of claim 19, further comprising:
maintaining the single LBA and size parameter for each entry of the plurality of entries corresponding to a storage element in the background space that has been partially overwritten by one or more elements in the foreground space.

21. The method of claim 20, further comprising:
for a given write request including a new storage element to be written to a location in the NVM storage array,
creating a new entry in the background space in the dual-scope directory structure for the new storage element when the location is currently available to store new data.

22. The method of claim 20, further comprising:
for a given write request including a new storage element to be written to a location in the NVM storage array,
creating a new entry in the background space in the dual-scope directory structure for the new storage element when the location is currently storing one or more previously stored storage elements in the background space that would be completely overwritten by the new storage element but not storing one or more previously stored storage elements in the background space that would be partially overwritten.

23. The method of claim 20, further comprising:
for a given write request including a new storage element to be written to a location in the NVM storage array,
creating a new entry in the foreground space in the dual-scope directory structure for the new storage element when the location is currently storing one or more previously stored storage elements in the background space that would be partially overwritten.

24. The method of claim 20, further comprising:
for a given NVM storage array read request beginning at a LBA start address of the read request and continuing to a LBA end address of the read request, and wherein for each address location in the NVM storage array from the LBA start address to the LBA end address,
reading data from a storage element in the NVM storage array corresponding to a foreground space entry when a foreground space entry is present; and
reading data from a storage element in the NVM storage array corresponding to a background space entry when a foreground space entry is not present.

25. The method of claim 20, further comprising:
for a given write request including a new storage element to be written to a location in the NVM storage array,
creating a new entry in the background space in the dual-scope directory structure for the new storage element when the creation of the new entry in the background space increases the overall number of entries in the background space required to represent all storage elements stored in the NVM array by at most one entry.

* * * * *